United States Patent [19]

Jop

[11] 4,449,054

[45] May 15, 1984

[54] ELECTRONIC CIRCUIT FOR CONTROLLING THE SUPPLY VOLTAGE OF ELECTROMAGNETS, ELECTRIC MOTORS, RESISTORS, IN SINGLE- AND THREE-PHASE SYSTEMS

[76] Inventor: Fiorenzo Jop, Via Montebaldo, 29 - Carate Brianza, (Provincia di Milano, Italy

[21] Appl. No.: 376,897

[22] Filed: May 10, 1982

[30] Foreign Application Priority Data

May 18, 1981 [IT] Italy ................ 21764 A/81

[51] Int. Cl.³ ............................ H03K 17/56
[52] U.S. Cl. ................ 307/31; 307/252 B; 363/128; 323/217
[58] Field of Search ............... 307/31, 252 B, 252 N; 323/217, 282, 320; 361/154, 155; 363/128

[56] References Cited

U.S. PATENT DOCUMENTS 3,980,943 9/1976 Cailleux et al. ............ 363/128

OTHER PUBLICATIONS

Galloway, J. H., *Application Note*, "Using the Triac for Control of AC Power" Mar. 1966.

*Primary Examiner*—George H. Miller, Jr.
*Assistant Examiner*—Todd E. DeBoer
*Attorney, Agent, or Firm*—Guido Modiano; Albert Josif

[57] ABSTRACT

The control circuit comprises a solid state controlled switch coupled to a terminal of the mains and a terminal of the load the supply voltage whereof has to be controlled, and a non controlled solid state switch operatively coupled to the solid state controlled switch for setting, in cooperation with resistive and capacitive elements, also supplied by the mains, the conduction time of the controlled switch in such a way as to adjust at predetermined maximum and minimum levels the load supply voltage.

1 Claim, 5 Drawing Figures

ELECTRONIC CIRCUIT FOR CONTROLLING THE SUPPLY VOLTAGE OF ELECTROMAGNETS, ELECTRIC MOTORS, RESISTORS, IN SINGLE- AND THREE-PHASE SYSTEMS

BACKGROUND OF THE INVENTION

This invention relates to an electronic circuit for controlling the supply voltage of electromagnets, electric motors, resistors, in single- and three-phase systems without making use of auxiliary power inputs.

Several circuits have been proposed and are available commercially which enable the voltage applied to a load, such as electromagnets, motors, resistors, to be controlled in single- and three-phase systems; in a type of these circuits, additionally to the load power supply proper, either auxiliary power inputs or auxiliary drive circuits for the control circuit must be provided in order to obtain a precise adjusting of the load voltage.

In another type, on the other hand, generally of the phase shifting class using RC networks, the control power is directly supplied by the load power supply, thereby the circuitry is a comparatively simple one with respect to the first type; however the adjusting is scarcely accurate, mainly with respect to the maximum and minimum RMS load voltage.

Such prior circuits, regardless of their actual construction, have all the disadvantage of being both expensive and complicated.

SUMMARY OF THE INVENTION

Accordingly, the task of the present invention is to provide an electronic control circuit of the second mentioned type, effective to provide a fine and precise adjusting of the load RMS voltage, in particular of the maximum and minimum values thereof.

Within this task it is an object of the invention to provide an electronic control circuit as indicated, which, in addition to affording the possibility of being used either in monophase or in three-phase systems, is simple and economical.

Another object of this invention is to provide an electronic control circuit as indicated, which can be assembled from commercially readily available elements.

The mentioned task and objects, as well as yet other objects which will become more apparent hereinafter are achieved by an electronic circuit for controlling the supply voltage of electromagnets, electric motors, electric resistances and the like, comprising a solid state controlled switch having a control electrode and series coupled between a supply source and the electric load, a solid state switch electrically coupled to the control electrode of said controlled switch and a phase shifting RC network electrically coupled to said solid state switch for switching on said solid state switch and triggering said solid state controlled switch, characterized in that said RC network includes resistor and capacitor elements effective to provide a fine adjusting of the on and off times of said controlled switch and cooperating in such a way as to allow for the load voltage to be accurately varied in a given broad range.

BRIEF DESCRIPTION OF THE DRAWINGS

Further features and advantages of the invention will be apparent from the following detailed description of two preferred, though not limitative, embodiments of the inventive circuit, with reference to the accompanying drawings, given herein by way of illustration only and where.

DESCRIPTION OF THE PREFERRED EMBODIMENTS

Figure 1:
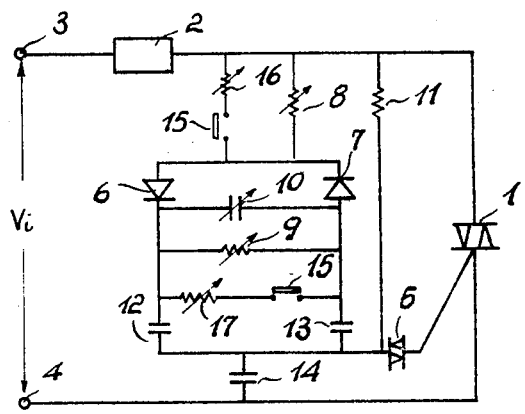
FIG. 1 is a circuit diagram of a load supply voltage controlling circuit according to a first embodiment of the present invention.
Figure 3:
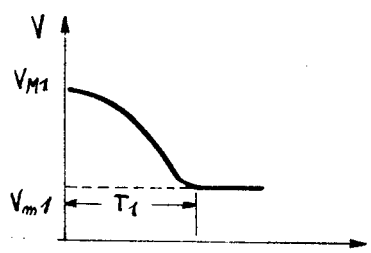
FIGS. 3 and 4 show two graphs of the RMS voltage applied to the load.
Figure 4:
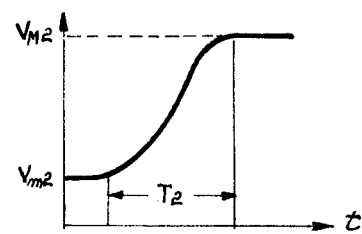

With reference to FIG. 1, this circuit for regulating and controlling the supply voltage to a load, operating in the full-wave mode, comprises a solid state controlled bilateral switch or triac, indicated at 1, to one terminal whereof a load 2 is connected serially. The mains voltage to be controlled is applied to those terminals, designated with the reference numerals 3 and 4, which are left available and not interconnected on the load 2 and triac 1. To the control electrode of the triac 1, there is connected a non-controlled bilateral switch or diac 5 which controls the conductive state of the triac 1. The diac 5 is driven by means of a circuit, which in addition to two diodes 6 and 7 respectively, each arranged to control one opposite sign half-wave, also comprises variable resistors and capacitors which allow the RMS voltage applied to the load and the duration of the transients to be set according to necessity. In particular, a variable resistor 8 allows adjustment of the voltage peak to be applied to the load, indicated at $V_M$ in FIGS. 3 and 4, while a variable resistor 9 regulates the lowest voltage level to be applied to the load, as indicated at $V_m$ in FIGS. 3 and 4. A variable capacitor 10 enables instead the transient durations to be set, as indicated at $T_1$ and $T_2$, respectively, in FIGS. 3 and 4. The circuit further includes a resistor 11, which determines the voltage absolute minimum to be applied to the load independently of the regulated levels of the resistor 9, and two capacitors 12 and 13, respectively, which determine the minimum time lapse between the voltage maximum and minimum levels applied to the load. Lastly, a capacitor 14, in cooperation with the diac 5, determines, through trigger time circuits RC, the partialization of the voltage being applied to the load.

By this arrangement of the RC phase shifting network it has been surprisingly found that, differently from the prior art triggering RC networks, the load voltage may be very accurately adjusted and moreover each adjusted voltage value is very stable in the time for any settings of the variable resistors 8, 9, 16 and 17 and variable capacitor 10. In particular very stable minimum and maximum adjusted voltage values are obtained.

The operation of the circuit 1 will not be presently discussed because it is quite similar to that of the simplified circuit embodiment of FIG. 2, which will be explained hereinafter. Only mentioned is the fact that, where DC voltages are handled, either of diodes 6,7 and of capacitors 12,13 may be omitted from the circuit of FIG. 1, or would not be involved, and the resistor 9 and capacitor 10 will be coupled in parallel to the capacitor 12 or 13 in operation. Moreover, to achieve voltage levels to be applied to the electric load in accordance with the graph of FIG. 3, it will be sufficient to apply the input voltage $V_i$ after the maximum or peak voltage level has been set with the resistor 8, the minimum or lowest voltage level set with the resistor 9, and the time $T_1$, corresponding to the transient duration, set by means of the capacitor 10. To achieve instead voltage levels to be applied to the electric load in accordance with the graph shown in FIG. 4, the resistors 8 and 9 are set for minimum desired voltage levels, thereafter the input voltage $V_i$ is applied and the contacts, indicated at 15, of a relay are closed to thus complete the circuit including the resistors 16 and 17 which determine, respectively, the minimum and maximum voltage levels to be applied to the load, the transient duration time $T_2$ being again set by means of the variable capacitor 10.

Figure 2:
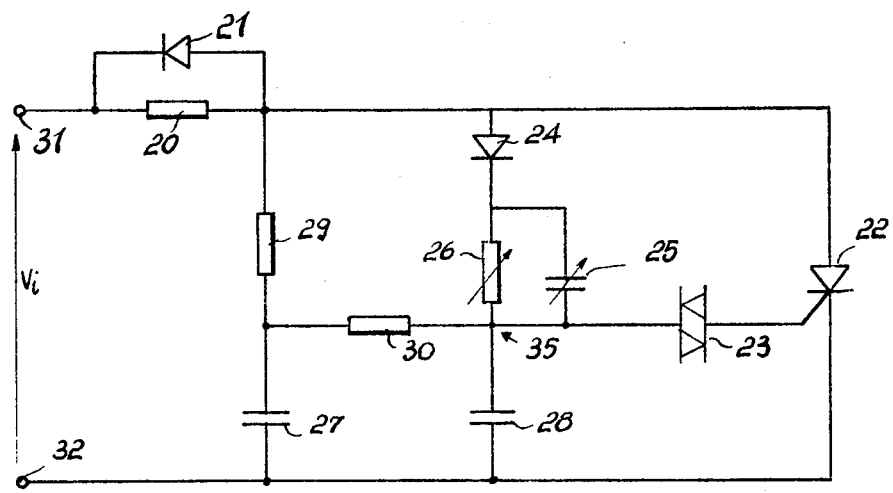
FIG. 2 shows a diagram similar to that of FIG. 1 but with half-wave rectification.

FIG. 2 illustrates a simplified embodiment of the circuit of FIG. 1, which is suitable for an ohmic or ohmic-inductive load with a half-wave rectifying circuit. In the instance of FIG. 2, the load, indicated at 20 and being protected by a flywheel diode 21, is fed through a circuit comprising an SCR 22 driven by a diac 23 and by a group RC including the resistor 26 and capacitor 25. Also provided is a half-wave rectifying diode 24, as are two capacitors 27,28 and two resistors 29,30.

Figure 5:
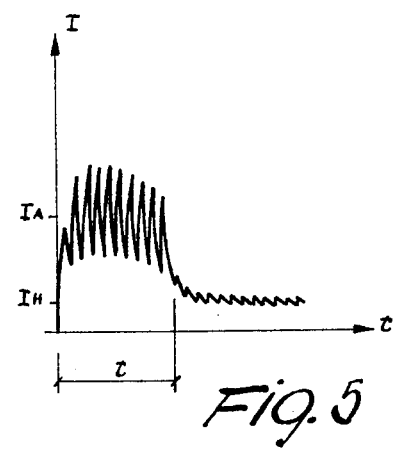
FIG. 5 shows a graph depicting instantaneous current through an inductive load vs. time.

The circuit of FIG. 2, which is similar to that of FIG. 1 but is only operative in the positive half-wave mode, operates in the following manner. Across the terminals 31 and 32 is applied the mains voltage, e.g. an AC mains voltage. That voltage is half-wave rectified by the diode 21, while the group RC comprising the capacitor 25 and resistor 26 generates at 35 an out-of-phase (unidirectional) voltage with respect to the mains voltage across the terminals 31 and 32. As the voltage at 35 exceeds the tripping or breakover threshold of the diac 23, the SCR 22 triggers to partialize or control the mains voltage on the load. The capacitor 25 generates a shunting effect such as to produce a faster charging of the capacitor 28, thus enabling the threshold value of the diac 23 to be reached more rapidly. In this way, a lesser phase displacement or delay is achieved with respect to the mains voltage, thereby the triggering of the SCR is approximately in phase with the mains voltage. This phenomenon allows, therefore, the achievement of the initial effect depicted by the graph of FIG. 5 (which represents the initial pulse on an ohmic-inductive load).

Accordingly, also in this case, the adjustment is remarkably improved with respect to the prior art triggering RC networks and it is possible to obtain on the load a maximum RMS voltage value which practically coincides with the power supply RMS voltage, with delay triggering angle of the order of a fraction of degree.

In particular the resistor 26 determines the value of the average current upon termination of the initial transient, so that by adjusting its value, it becomes possible to change the time constant of the capacitor 28 charging. The capacitor 25 allows instead the duration of the transient or initial forced switching (indicated at t in FIG. 5 of the drawings) to be varied. The diode 21, in parallel with the load 20, performs the function of a flywheel diode, and therefore, it is only required where the load is an ohmic-inductive one, whilst the resistors 29 and 30 (the values whereof are selected in accordance with mains voltage being used) together with the capacitor 27 have the function of optimizing the constancy of the charge to the capacitor 28, in particular at low values.

The invention as conceived is susceptible to many modifications and variations without departing from the scope of the instant inventive concept. In particular, instead of the variable resistors specified hereinabove, for automatic control purposes, thermoresistors, photoresistors, transistors, or components performing the same functions, may be provided.

I claim:

1. An electronic circuit for controlling the supply voltage of electromagnets, electric motors, electric resistances and the like, comprising a solid state controlled switch having a control electrode and series coupled between a supply source and the electric load, a solid state switch electrically coupled to the control electrode of said controlled switch and a phase shifting RC network electrically coupled to said solid state switch for switching on said solid state switch and triggering said solid state controlled switch, wherein said RC network includes resistor and capacitor elements effective to provide a fine adjusting of the on and off times of said controlled switch and cooperating in such a way as to allow for the load voltage to be accurately varied in a given broad range wherein said controlled switch is a silicon bilateral controlled switch or TRIAC and said solid state switch is a silicon bilateral switch or DIAC, characterized in that said RC network comprises a first diode and a second diode, a first variable resistor coupled between one end of the load and the coupling point of the cathode of said first diode and the anode of said second diode, said first variable resistor being effective to set the load maximum RMS voltage, a second variable resistor coupled between the cathode of said first diode and the anode of said second diode, said second variable resistor being effective to set the load minimum RMS voltage, a third and fourth variable resistors respectively coupled in parallel to said first and second variable resistors and cooperating therewith for finely adjusting said load maximum and minimum RMS voltage, a first variable capacitor coupled in parallel with said second variable resistor, a second and third capacitors having one respective end commonly coupled and the other two respectively coupled to the cathode of said first diode and to the anode of said second diode, a fourth capacitor coupled between the coupling common point of said second and third capacitors and the ground and a fixed resistor coupled between said end of said load and one end of said DIAC.

* * * * *